2,693,423

Patented Nov. 2, 1954

2,693,423

GLASS COMPOSITIONS

Frederick R. Rogers, Hornby, N. Y., assignor to Vitreous Research Corporation, Painted Post, N. Y., a corporation of New York No Drawing. Application March 23, 1950, Serial No. 151,521

8 Claims. (Cl. 106—53)

---

This invention relates to glass compositions, and more particularly, to castable glasses which are adapted for use in glass-to-metal seals.

The primary object of my invention is to provide new castable glass compositions having low working temperatures, low coefficients of expansion, and high fluidity at low temperatures.

Another object of my invention is to provide improved hermetic glass seals with metals having low coefficients of expansion in the range of about 45 to $70 \times 10^{-7}$ cm./cm./° C., 20°–300° C.

A still further object of the present invention is to provide an improved hermetic seal with the alloy known as No. 42 Alloy, comprising approximately 42% nickel, the balance being substantially iron.

In accordance with my invention, I have discovered a new group of glasses which are readily cast, possess low softening temperatures, and exhibit high fluidity at moderate working temperatures. These glasses comprise essentially mixtures of selected metaborates in certain critical proportions which may be conveniently divided into three sub-groups as follows: (1) Those compositions which correspond essentially to the following formulations expressed in per cent by weight: 30 to 65% $Al(BO_2)_3$; and 5 to 40% of at least one divalent metaborate of the group consisting of $Ba(BO_2)_2$, $Ca(BO_2)_2$, $Sr(BO_2)_2$ and $Pb(BO_2)_2$. (2) Those compositions in which the $Al(BO_2)_3$ is replaced in part by either or both $Zn(BO_2)_2$ and $Mg(BO_2)_2$ in an amount of up to 25% of each of the latter two metaborates. However, there must be at least 10% $Al(BO_2)_3$ present in such a case and the total amount of this first group must still be between 30 and 65%. (3) Those compositions of sub-groups (1) and (2) which also contain 5 to 30% of metaborates of the group consiting of $NaBO_2$, $KBO_2$ and $LiBO_2$. When $Zn(BO_2)_2$ and/or $Mg(BO_2)_2$ are present in the glass, I prefer that they constitute at least 5% by weight of the final glass.

The oxide percentages corresponding to the metaborate percentages recited in the three sub-groups are given below.

Sub-group I

| $Al(BO_2)_3$ | $Al_2O_3$ | $B_2O_3$ |
|---|---|---|
| 30 | 9.8 | 20.1 |
| 65 | 21.3 | 43.7 |
| $Ba(BO_2)_2$ | $BaO$ | $B_2O_3$ |
| 5 | 3.4 | 1.6 |
| 40 | 27.5 | 12.5 |
| $Ca(BO_2)_2$ | $CaO$ | $B_2O_3$ |
| 5 | 2.2 | 2.8 |
| 40 | 17.8 | 22.2 |
| $Pb(BO_2)_2$ | $PbO$ | $B_2O_3$ |
| 5 | 3.8 | 1.2 |
| 40 | 30.5 | 9.5 |
| $Sr(BO_2)_2$ | $SrO$ | $B_2O_3$ |
| 5 | 2.9 | 2.1 |
| 40 | 23.2 | 16.8 |

Sub-group II

| $Al(BO_2)_3$ | $Al_2O_3$ | $B_2O_3$ |
|---|---|---|
| 10 | 3.3 | 6.7 |
| 60 | 19.6 | 40.4 |
| $Zn(BO_2)_2$ | $ZnO$ | $B_2O_3$ |
| 5 | 2.7 | 2.3 |
| 25 | 13.4 | 11.6 |
| $Mg(BO_2)_2$ | $MgO$ | $B_2O_3$ |
| 5 | 1.8 | 3.2 |
| 25 | 9.1 | 15.9 |

Sub-group III

| $NaBO_2$ | $Na_2O$ | $B_2O_3$ |
|---|---|---|
| 5 | 2.35 | 2.65 |
| 30 | 14.10 | 15.90 |
| $KBO_2$ | $K_2O$ | $B_2O_3$ |
| 5 | 2.8 | 2.2 |
| 30 | 16.8 | 13.2 |
| $LiBO_2$ | $Li_2O$ | $B_2O_3$ |
| 5 | 1.5 | 3.5 |
| 30 | 9.0 | 21.0 |

In order to obtain certain specific and desirable characteristics in the glasses, it has been found that other oxides may be added to the parent metaborate glass without impairing the essential properties of the glass. These oxides dissolve in the metaborate glass and become an integral part thereof. Other oxides which may be used and their maximum percentages by weight based on the final glass are as follows: $SiO_2$ up to 20%, $Al_2O_3$ up to 10%, $SnO_2$ up to 2%, $TiO_2$ up to 10% and $ZnO$ up to 10%. I prefer those glasses in which there is at least 5% by weight of $SiO_2$. The total amount of such oxides preferably does not exceed 30% by weight of the glass if all the desirable properties of my new glasses are to be obtained.

I have found that the above defined glasses can be readily cast because of their low softening temperatures and high fluidity at moderate working temperatures. They have softening temperatures ranging between about 475° C. and 850° C. They are eminently suited to be cast into intricate shapes. A further advantage of my glasses is the fact that they fine readily without the necessity of special fining agents. They exhibit little tendency to become cordy. Another advantage is the stability of the melt at working temperatures. These glasses are not easily volatilized at convenient casting temperatures.

For the above and other reasons the glasses of the present invention are especially suited for the manufacture of glass-to-metal seals wherein the metal or alloy has a coefficient of expansion in the range of 45 to $70 \times 10^{-7}$ in the range of 20°–300° C. Because of their castability they serve particularly well in the manufacture of the larger types of hermetic seals, especially with multiple electrodes, and insulator bushings with metal inserts. Owing to the low temperature at which the glasses can be cast, there is no spattering of ferrous metal when an iron alloy is heated to the sealing temperature. I have further found that these glasses are consistently uniform in their properties from melt to melt which promotes economical manufacturing.

In Table I examples of my new compositions falling within the scope of this invention are given in terms of weight per cent as calculated from their respective batches.

TABLE I

| Glass | A | B | C | D | E |
|---|---|---|---|---|---|
| $Al(BO_2)_3$ | 36.2 | 31.6 | 34.7 | 33.2 | 33.8 |
| $Zn(BO_2)_2$ | 11.6 |  | 7.3 | 7.4 | 19.7 |
| $Ca(BO_2)_2$ | 20.1 | 20.8 |  | 13.8 |  |
| $KBO_2$ | 6.0 | 5.9 | 3.9 |  |  |
| $LiBO_2$ | 10.0 | 10.5 | 11.6 |  |  |
| $NaBO_2$ |  | 2.5 |  |  |  |
| $Ba(BO_2)_2$ |  |  | 3.8 | 22.8 | 8.4 |
| $Pb(BO_2)_2$ |  |  | 23.3 |  | 21.1 |
| $SiO_2$ | 16.1 | 16.7 | 15.5 | 15.8 | 16.9 |
| $SnO_2$ |  | 1.7 |  |  |  |
| $Mg(BO_2)_2$ |  |  |  | 6.9 |  |
| $Al_2O_3$ |  | 10.4 |  |  |  |
| Coef. Exp. $\times 10^7$ | 54.6 | 58.0 | 60 | 56 | 48 |
| Annealing Temp., ° C | 503 | 510 | 470 | 590 | 510 |
| Softening Temp., ° C | 641 | 650 | 605 | 735 | 641 |

In the following Table II are given the oxide analyses of the glasses in Table I.

TABLE II

| Glass | A | B | C | D | E |
|---|---|---|---|---|---|
| $Al_2O_3$ | 11.9 | 20.7 | 11.4 | 10.9 | 11.1 |
| ZnO | 6.3 | | 3.9 | 4.0 | 10.6 |
| MgO | | | | 2.5 | |
| CaO | 9.0 | 9.3 | | 6.2 | |
| BaO | | | 2.6 | 15.7 | 5.8 |
| SrO | | | | | 16.1 |
| PbO | | | 17.8 | | |
| $K_2O$ | 3.5 | 3.3 | 2.2 | | |
| $Na_2O$ | | 1.2 | | | |
| $Li_2O$ | 3.0 | 3.2 | 3.5 | | |
| $B_2O_3$ | 50.4 | 43.9 | 43.2 | 44.9 | 39.4 |
| $SiO_2$ | 16.1 | 16.7 | 15.5 | 15.8 | 16.9 |
| $SnO_2$ | | 1.7 | | | |

In the following Table III are given the batch compositions in parts by weight of the glasses appearing in Table I.

TABLE III

| Glass | A | B | C | D | E |
|---|---|---|---|---|---|
| $Al_2O_3$ | 11.9 | 20.7 | 11.4 | 11.2 | 11.1 |
| ZnO | 6.7 | | 4.2 | 4.3 | 11.3 |
| MgO | | | | 2.5 | |
| $CaCO_3$ | 15.9 | 16.6 | | 11.0 | |
| $BaCO_3$ | | | 3.3 | 20.2 | 7.5 |
| PbO | | | 17.8 | | 16.1 |
| $Na_2B_4O_7$ | | 6.1 | | | |
| $K_2CO_3$ | 5.0 | 4.9 | 3.2 | | |
| $Li_2CO_3$ | 7.5 | 7.8 | 8.6 | | |
| $H_3BO_3$ | 92.2 | 75.1 | 78.6 | 80.2 | 75.5 |
| $SiO_2$ | 16.1 | 16.7 | 15.5 | 15.8 | 16.9 |
| $SnO_2$ | | 1.7 | | | |

I have found that glasses corresponding substantially to glass A in the above tables serve extremely well in the manufacture of hermetic glass-to-metal seals with No. 42 Alloy, which comprises approximately 42% by weight of nickel, the balance being iron. The percentage composition of the ingredients of glass A may be varied from 1 to 3 per cent either way and yet seal effectively to Alloy No. 42.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A glass composition consisting essentially of 30 to 65% by weight of a mixture of metaborates consisting of $Al(BO_2)_3$ and at least one metaborate of the group consisting of $Zn(BO_2)_2$ and $Mg(BO_2)_2$, the $Al(BO_2)_3$ being present in the amount of at least 10% by weight and the $Zn(BO_2)_2$ and $Mg(BO_2)_2$, when present, being in an amount between 5 and 25% by weight respectively; 5 to 40% by weight of at least one divalent metaborate of the group consisting of $Ba(BO_2)_2$, $Ca(BO_2)_2$, $Sr(BO_2)_2$, and $Pb(BO_2)_2$; and containing 5 to 30% by weight of at least one metaborate of the group consisting of $NaBO_2$, $KBO_2$ and $LiBO_2$, and from 5 to 20% by weight of $SiO_2$.

2. A glass composition consisting essentially of 10 to 60% by weight of $Al(BO_2)_3$, 5 to 25% by weight of $Zn(BO_2)_2$, the sum total of said metaborates being between 30 and 65%; 5 to 40% by weight of at least one divalent metaborate of the group consiting of $Ba(BO_2)_2$, $Ca(BO_2)_2$, $Sr(BO_2)_2$ and $Pb(BO_2)_2$; 5 to 30% by weight of at least one metaborate of the group consisting of $NaBO_2$, $KBO_2$ and $LiBO_2$, and 5 to 20% by weight of $SiO_2$.

3. A glass composition consisting essentially of 10 to 60% by weight of $Al(BO_2)_3$, 5 to 25% by weight of $Zn(BO_2)_2$, the sum total of said metaborates being between 30 and 65%; 5 to 40% by weight of $Ca(BO_2)_2$; 5 to 30% by weight of at least one metaborate of the group consisting of $NaBO_2$, $KBO_2$, and $LiBO_2$, and 5 to 20% by weight of $SiO_2$.

4. A glass composition corresponding essentially to the following formulation expressed in per cent by weight: 36.2% $Al(BO_2)_3$, 11.6% $Zn(BO_2)_2$, 20.1% $Ca(BO_2)_2$, 6.0% $KBO_2$, 10.0% $LiBO_2$, and 16.1% $SiO_2$.

5. A glass composition corresponding essentially to the following formulation expressed in per cent by weight: 34.7% $Al(BO_2)_3$, 7.3% $Zn(BO_2)_2$, 3.9% $KBO_2$, 11.6% $LiBO_2$, 3.8% $Ba(BO_2)_2$, 23.3% $Pb(BO)_2$, and 15.5% $SiO_2$.

6. A glass composition corresponding essentially to the following formulation expressed in per cent by weight: 33.2% $Al(BO_2)_3$, 7.4% $Zn(BO_2)_2$, 13.8% $Ca(BO_2)_2$, 22.8% $Ba(BO_2)_2$, 6.9% $Mg(BO_2)_2$ and 15.8% $SiO_2$.

7. A glass composition corresponding essentially to the following formulation expressed in per cent by weight: 33.8% $Al(BO_2)_3$, 19.7% $Zn(BO_2)_2$, 8.4% $Ba(BO_2)_2$, 21.1% $Pb(BO_2)_2$, and 16.9% $SiO_2$.

8. A glass composition corresponding essentially to the following formulation expressed in per cent by weight: 31.6% $Al(BO_2)_3$, 20.8% $Ca(BO_2)_2$, 5.9% $KBO_2$, 10.5% $LiBO_2$, 2.5% $NaBO_2$, 16.7% $SiO_2$, 1.7% $SnO_2$ and 10.4% $Al_2O_3$.

References Cited in the file of this patent

UNITED STATES PATENTS

| Number | Name | Date |
|---|---|---|
| 1,609,329 | Taylor | Dec. 7, 1926 |
| 1,736,642 | Beaudry | Nov. 19, 1929 |
| 2,030,389 | Navias | Feb. 11, 1936 |
| 2,090,098 | Berger et al. | Aug. 17, 1937 |
| 2,167,482 | Hull et al. | July 25, 1939 |
| 2,299,750 | Hull et al. | Oct. 27, 1942 |
| 2,478,626 | Grigorieff | Aug. 9, 1949 |
| 2,511,228 | Sun et al. | June 13, 1950 |

OTHER REFERENCES

Ser. No. 358,067, Herriger (A. P. C.), published May 11, 1943.